(12) United States Patent
Tang et al.

(10) Patent No.: US 10,416,503 B2
(45) Date of Patent: Sep. 17, 2019

(54) BLUE PHASE LIQUID CRYSTAL DISPLAY MODULE, BLUE PHASE LIQUID CRYSTAL DISPLAY DEVICE AND MANUFACTURING METHOD FOR THE SAME

(71) Applicant: Wuhan China Star Optoelectronics Technology Co., Ltd., Wuhan, Hubei (CN)

(72) Inventors: Yuejun Tang, Guangdong (CN); Hongqing Cui, Guangdong (CN); De-Jiun Li, Guangdong (CN); Haiyan Sun, Guangdong (CN); Dandan Liu, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/944,763

(22) Filed: Apr. 3, 2018

(65) Prior Publication Data

US 2018/0224703 A1 Aug. 9, 2018

Related U.S. Application Data

(62) Division of application No. 14/888,983, filed on Nov. 4, 2015, now Pat. No. 9,964,813.

(51) Int. Cl.
*G02F 1/1343* (2006.01)
*G02F 1/1333* (2006.01)
(Continued)

(52) U.S. Cl.
CPC ...... *G02F 1/134309* (2013.01); *G02F 1/1341* (2013.01); *G02F 1/13394* (2013.01);
(Continued)

(58) Field of Classification Search
CPC .................. G02F 2001/13793; G02F 1/1341
See application file for complete search history.

(56) References Cited

U.S. PATENT DOCUMENTS

2010/0302492 A1* 12/2010 Kubota ............. G02F 1/134363
349/138
2015/0323833 A1* 11/2015 Xie .................. G02F 1/133555
349/33

(Continued)

*Primary Examiner* — Michael H Caley
*Assistant Examiner* — Jonathan Y Jung
(74) *Attorney, Agent, or Firm* — Andrew C. Cheng

(57) ABSTRACT

A blue phase liquid crystal display module and device, and a method for manufacturing the same are disclosed. The module includes an upper substrate, a lower substrate disposed oppositely, multiple blue phase liquid crystal molecules disposed between the upper substrate and the lower substrate, multiple upper common electrodes disposed in parallel and spaced at intervals on the upper substrate, multiple lower common electrodes disposed in parallel and spaced at intervals on the lower substrate, wherein the lower common electrodes are staggered with the upper common electrodes, and a pixel electrode disposed on the lower substrate, wherein the pixel electrode is a hollow concave-convex structure, the pixel electrode has alternating projections and depressions such that multiple oblique electric fields are generated among the pixel electrode, the upper common electrodes and the lower common electrodes in order to drive the blue phase liquid crystal molecules.

7 Claims, 4 Drawing Sheets

(51) Int. Cl.
*G02F 1/1341* (2006.01)
*G02F 1/1337* (2006.01)
*G02F 1/137* (2006.01)
*G02F 1/1339* (2006.01)

(52) U.S. Cl.
CPC .... G02F 1/13439 (2013.01); G02F 1/133345 (2013.01); G02F 1/133707 (2013.01); *G02F 2001/13396* (2013.01); *G02F 2001/13793* (2013.01); *G02F 2001/134318* (2013.01); *G02F 2001/134381* (2013.01); *G02F 2201/121* (2013.01); *G02F 2201/122* (2013.01); *G02F 2201/123* (2013.01); *G02F 2201/128* (2013.01)

(56) References Cited

U.S. PATENT DOCUMENTS

2017/0192260 A1* 7/2017 Tang .................. G02F 1/137
2018/0031874 A1* 2/2018 Tang ................ G02F 1/133555

* cited by examiner

BLUE PHASE LIQUID CRYSTAL DISPLAY MODULE, BLUE PHASE LIQUID CRYSTAL DISPLAY DEVICE AND MANUFACTURING METHOD FOR THE SAME

CROSS REFERENCE TO RELATED APPLICATIONS

This is a divisional application of co-pending U.S. patent application Ser. No. 14/888,983, filed on Nov. 4, 2015, which is a national stage of PCT Application No. PCT/CN2015/086880, filed on Aug. 13, 2015, claiming foreign priority of Chinese Patent Application No. 201510482306.X, filed on Aug. 3, 2015.

BACKGROUND OF THE INVENTION

1. Field of the Invention

The present invention relates to a liquid crystal display technology field, and more particularly to a blue phase liquid crystal display module, a blue phase liquid crystal display device and a manufacturing for the same.

2. Description of Related Art

Comparing with the liquid crystal materials widely used for the liquid crystal display, the blue phase liquid crystal molecule has following four outstanding advantages: (1) The response time of the blue phase liquid crystal molecule is within sub-millisecond, and can reach a high speed driving above 240 Hz without requiring the over drive technology in order to reduce a dynamic blur of a motion picture. When utilizing three primary colors of red, green and blue light emitting diodes (RGB-LED) as a backlight source, a color filter film is not required. Using the blue phase liquid crystal molecule can reach a field-sequential-color-timing display; (2) the blue phase liquid crystal molecule does not require an alignment layer which is required for other kinds of display modes. The manufacturing process is simplified and the cost is reduced; (3) In macroscopic view, the blue phase liquid crystal molecule is optically isotropic such that a blue phase liquid crystal device has features of wide viewing angle and well dark state; (4) When a cell thickness of a blue phase liquid crystal cell is greater than a penetration depth of an electric field, an affection of a change of a cell thickness of a liquid crystal cell with respect to transmittance rate can be ignored. That feature is suitable for manufacturing a large screen or single board liquid crystal display device.

However, in the conventional art, the blue phase liquid crystal encounters a problem of large driving voltage. Currently, improving the performance of a blue phase liquid crystal material or optimizing an electrode structure is usually utilized. However, the method that improving the performance of a blue phase liquid crystal material such as manufacturing a blue phase liquid crystal material with a big Kerr constant relates to a complex process for synthesizing a blue phase liquid crystal material. For example, when preparing a polymer of stable blue phase liquid crystal material, series factors of monomer, photo initiator, and synthesis conditions should be considered. Accordingly, the research and design cost is very expensive. For the method that optimizing an electrode structure, because an In-Plane Switching (IPS) driving method is used, a penetration depth generated by a lateral electric field of parallel electrodes is limited, and a higher driving voltage is required. Therefore, the blue phase liquid crystal display technology using IPS driving method has to be improved continuously.

In the conventional art, the reason that a liquid crystal display panel using a blue phase liquid crystal cannot adopt a vertical field is: after a liquid crystal display panel is applied with a voltage, under a function of a vertical electric field formed by a pixel electrode on an array substrate and a common electrode on an opposite substrate, the blue phase liquid crystal is stretched in a vertical direction. After a polarized light passes through a blue phase liquid crystal which is stretched in the vertical direction, a phase of the polarized light does not change. A polarized state after the polarized light passing through the blue phase liquid crystal is the same as a state that the blue phase liquid crystal display panel does not be applied with a voltage. Besides, because absorption axes of an upper polarizer and a lower polarizer of the liquid crystal display panel are perpendicular with each other, lights emitted from a backlight source cannot pass through the liquid crystal display panel so that a bright state of the liquid crystal display panel cannot be obtained. Accordingly, the above vertical electric field cannot realize a display of every grayscale of the blue phase liquid crystal display panel.

SUMMARY OF THE INVENTION

The embodiment of the present invention provides a blue phase liquid crystal display module, a blue phase liquid crystal display device and a manufacturing for the same in order to solve a large driving voltage in the conventional art and a technology problem that a bright state of a liquid crystal display panel is unable to obtain when a vertical electric field is adopted.

In order to solve the above problem, an embodiment of the present invention provides a blue phase liquid crystal display module, comprising: an upper substrate; a lower substrate disposed oppositely to the upper substrate; multiple blue phase liquid crystal molecules disposed between the upper substrate and the lower substrate; multiple upper common electrodes disposed in parallel and spaced at intervals on the upper substrate; multiple lower common electrodes disposed in parallel and spaced at intervals on the lower substrate, wherein the lower common electrodes are staggered with the upper common electrodes; and a pixel electrode disposed on the lower substrate, wherein, the pixel electrode is a hollow concave-convex structure, the blue phase liquid crystal molecules fills two sides of the pixel electrode, and the pixel electrode has alternating projections and depressions such that multiple oblique electric fields are generated among the pixel electrode, the upper common electrodes and the lower common electrodes in order to drive the blue phase liquid crystal molecules.

According to one preferred embodiment of the present invention, the pixel electrode is sawtooth-shaped, and an included angle between each sawtooth edge of the pixel electrode and the lower substrate or the upper substrate ranges from 25 degrees to 75 degrees.

According to one preferred embodiment of the present invention, the blue phase liquid crystal display module further includes an auxiliary spacer disposed between the upper substrate and the lower substrate.

According to one preferred embodiment of the present invention, a space between the pixel electrode and the upper substrate is D1, a space between the auxiliary spacer and the lower substrate or the upper substrate is D2, and D1 is greater than D2.

According to one preferred embodiment of the present invention, each of the projections or the depressions of the pixel electrode is a wedge shape, a trapezoidal shape or a circular shape.

According to one preferred embodiment of the present invention, the blue phase liquid crystal display module further includes an insulation layer disposed at an upper surface and/or a lower surface of the pixel electrode.

In order to solve above technology problems, the present invention also provides a blue phase liquid crystal display device, the blue phase liquid crystal display device includes a blue phase liquid crystal display module described in anyone of the above embodiments.

In order to solve above technology problem, an embodiment of the present invention further provides a method for manufacturing a blue phase liquid crystal display module, comprising steps of: forming multiple lower common electrodes on a lower substrate; coating a photoresist layer on the lower substrate; placing a mask plate having multiple parallel slots above the photoresist layer; using multiple unidirectional ultraviolet lights to obliquely irradiate and soften a portion of the photoresist layer through the slots of the mask plate in order to strip a photoresist which has been soften after removing the mask plate so as to form a photoresist surface having alternating projections and depressions; forming a pixel electrode layer on the photoresist surface such that the pixel electrode layer has alternating projections and depressions; etching a gap between pixel electrodes; stripping a photoresist under the pixel electrode layer; and filling blue phase liquid crystal molecules and covering with an upper substrate, wherein the upper substrate is provided with multiple upper common electrodes.

According to one preferred embodiment of the present invention, before the step of forming a pixel electrode layer on the photoresist surface, the method further comprises a step of: forming an insulation layer on the photoresist surface.

According to one preferred embodiment of the present invention, after the step of forming a pixel electrode layer on the photoresist surface, the method further comprises a step of: forming an insulation layer on the pixel electrode layer.

According to one preferred embodiment of the present invention, in the step of using multiple unidirectional ultraviolet lights to obliquely irradiate the photoresist layer through the slots of the mask plate in order to form a photoresist surface, each common electrode is located right below a top portion of a peak of the photoresist surface.

Comparing with the conventional art, for the blue phase liquid crystal module provided by the present invention, through manufacturing a hollow projected pixel electrode on a lower substrate of the blue phase liquid crystal module, utilizing oblique electric fields among the hollow projected pixel electrode, the upper substrate and the lower substrate to drive the blue phase liquid crystal molecules in order to decrease a driving voltage of the blue phase liquid crystal module. At the same time, a problem that cannot obtain a bright state of a liquid crystal display panel in a vertical electric field is avoided. In addition, through disposing a gap between the pixel electrodes, the blue phase liquid crystal molecules can reach an interior of the pixel electrode through a gap between the hollow projected pixel electrodes.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
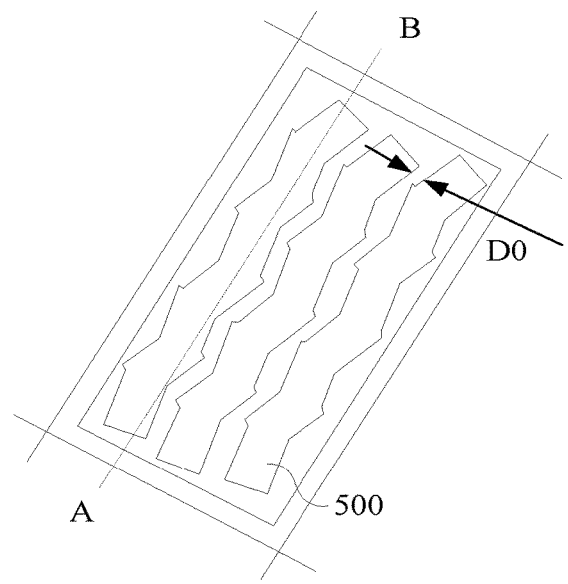
FIG. 1 is a schematic diagram of a blue phase liquid crystal display module according to an embodiment of the present invention.
Figure 2:
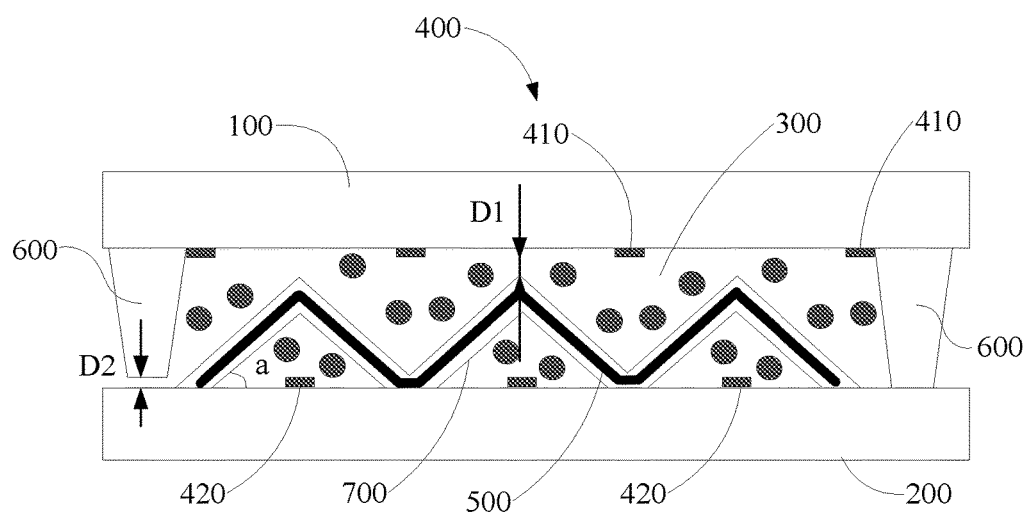
FIG. 2 is a cross-sectional view at A-B location of the blue phase liquid crystal display module shown in FIG. 1.

With reference to FIG. 1 and FIG. 2, FIG. 1 is a schematic diagram of a blue phase liquid crystal display module according to an embodiment of the present invention, and FIG. 2 is a cross-sectional view at A-B location of the blue phase liquid crystal display module shown in FIG. 1. The blue phase liquid crystal display module includes but not limited to following elements: an upper substrate 100, a lower substrate 200, multiple blue phase liquid crystal molecules 300, multiple common electrodes 400 disposed between the upper substrate 100 and the lower substrate 200 and a pixel electrode 500.

Specifically, the lower substrate 200 and the upper substrate 100 are disposed oppositely. The blue phase liquid crystal molecules 300 are disposed between the upper substrate 100 and the lower substrate 200. The common electrodes 400 further include upper common electrodes 410 and lower common electrodes 420. The upper common electrodes 410 are disposed in parallel and are spaced at intervals on the upper substrate 100. The lower common electrodes 420 are disposed in parallel and are spaced at intervals on the lower substrate 200. In addition, lower common electrodes 420 are staggered with the upper common electrodes 410.

The pixel electrode 500 is disposed on the lower substrate 200, and the pixel electrode 500 is a hollow concave-convex structure. The blue phase liquid crystal molecules 300 fill two sides of the pixel electrode 500. The pixel electrode 500 has alternating projections and depressions. Of course, the alternating projections and depressions can be sawtooth shapes, wedge shapes, trapezoidal shapes, circular shapes or a similar structure having convex portions and concave portions appeared alternately. Not enumerate here.

Multiple oblique electric fields are generated among the pixel electrode 500, the upper common electrode 410 and the lower common electrode 420. The oblique electric fields are distributed at two sides of the pixel electrode 500 in order to drive the blue phase liquid crystal molecules 300 so as to form an optical anisotropy having different values. Accordingly, the driving voltage of the blue phase liquid crystal molecules 300 is decreased.

In the present embodiment, each pixel electrode 500 is continuous sawtooth-shaped. The common electrodes 400 are disposed on the upper substrate 100 and the lower substrate 200 at intervals, and corresponding to saw teeth of the pixel electrode 500 respectively. An auxiliary spacer 600 is disposed between the upper substrate 100 and the lower substrate 200 for separating the upper substrate 100 and the lower substrate 200. Furthermore, the blue phase liquid crystal display module further includes an insulation layer 700 disposed on an upper surface and/or a lower surface of the pixel electrode 500. That is, the blue phase liquid crystal display module can only have one insulation layer 700. The one insulation layer can be located at the lower surface of the pixel electrode 500 for fixing the pixel electrode 500. Preferably, an included angle "a" between each sawtooth edge of the pixel electrode 500 and an lower substrate 200 or an upper substrate 100 ranges from 25 degrees to 75 degrees, and preferably, 45 degrees.

The pixel electrode 500 in the embodiment of the present invention utilizes a hollow projected electrode structure (specifically, a sawtooth shape). A space D0 is provided between the pixel electrodes. The upper substrate and the lower substrate are provided with common electrodes 400. The pixel electrode 500 is a hollow projected structure (specifically, a sawtooth shape). The pixel electrode 50 is surrounded by the plastic insulation layer 700. The blue phase liquid crystal molecules 300 fully fill an interior and an exterior of the hollow projected structure pixel electrode 500. Wherein, the blue phase liquid crystal molecules 300 reach a hollow portion of the pixel electrode 500 through the space D0 between the pixel electrodes 500.

Figure 3:
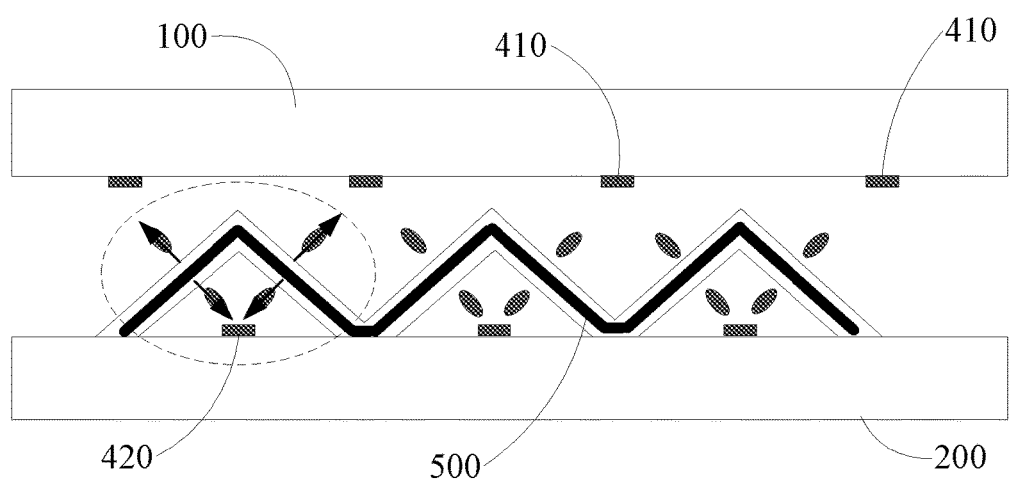
FIG. 3 is a cross-sectional view at A-B location of the blue phase liquid crystal display module when electrodes are applied with a voltage.

With reference to FIG. 3, FIG. 3 is a cross-sectional view at A-B location of the blue phase liquid crystal display module when electrodes are applied with a voltage. When the pixel electrode 500 and the common electrode 400 are applied with a voltage, the blue phase liquid crystal molecules 300 between the upper substrate and the lower substrate are arranged as shown in FIG. 3. Specifically, with reference to a dash line portion in FIG. 3, multiple oblique electric fields are generated among the pixel electrode 500, the upper common electrode 410 and the lower common electrode 420. The blue phase liquid crystal molecules 300 form an oblique optical anisotropy. A linear polarized light propagated vertically upward can generate a phase retardation in order to pass through an upper polarizer which is perpendicular to a lower polarizer.

With still reference to FIG. 2, a space between the hollow projected pixel electrode 500 and the upper substrate 100 is D1. A space between the auxiliary spacer (a photo spacer) 600 and the lower substrate 200 is D2. Wherein, D1 is greater than D2. By this way, even the blue phase liquid crystal display module is pressed by an external force, because the auxiliary spacer 600 abuts the upper substrate 100 in order to protect the projected pixel electrode 500, the pixel electrode 500 will not be destroyed. It should be noted that in order to maximally decrease the driving voltage of the blue phase liquid crystal molecules and match the pixel structure with the pixel size, the space D0 between the strip-shaped projected pixel electrodes 500, the distance D1 between the pixel electrode 500 and opposite substrate and the included angle "a" between the pixel electrode 500 and the upper substrate 100 or the lower substrate 200 can be optimized.

At the same time, the pixel electrode 500 may not be strip-shaped, and is other shapes. The only requirement is to reserve a space D0. The structure shape of the pixel electrode 500 is not limited. Wherein, the function of D0 is: 1) allowing the blue phase liquid crystal molecules 300 to enter the interior of the hollow projected pixel electrode 500 when a liquid crystal panel is assembled; 2) when stripping the internal photoresist material of the hollow projected (sawtooth-shaped) pixel electrode 500, the space D0 functions as a passageway for removing the material.

Besides, an arrangement of the pixel electrodes 500 is not limited to be parallel with long edges of pixels as shown in the present embodiment. Another arrangement can be utilized according to an actual requirement. For example, the strip-shaped pixel electrode 500 and a long edge of a pixel form an included angle as 45 degrees, or in parallel with a short edge of a pixel, and so on.

Comparing with the conventional art, for the blue phase liquid crystal module provided by the present invention, through manufacturing a hollow projected pixel electrode on a lower substrate of the blue phase liquid crystal module, utilizing oblique electric fields among the hollow projected pixel electrode, the upper substrate and the lower substrate to drive the blue phase liquid crystal molecules in order to decrease a driving voltage of the blue phase liquid crystal module. At the same time, a problem that cannot obtain a bright state of a liquid crystal display panel in a vertical electric field is avoided. In addition, through disposing a gap between the pixel electrodes, the blue phase liquid crystal molecules can reach an interior of the pixel electrode through a gap between the hollow projected pixel electrodes.

An embodiment of the present invention also provides a blue phase liquid crystal display device. The blue phase liquid crystal display device includes the blue phase liquid crystal display module described above. Of course, the blue phase liquid crystal display device further includes related structure units such as a case and a control circuit. In the range which can be understand by a person skilled in the art, no more repeating here.

Figure 4:
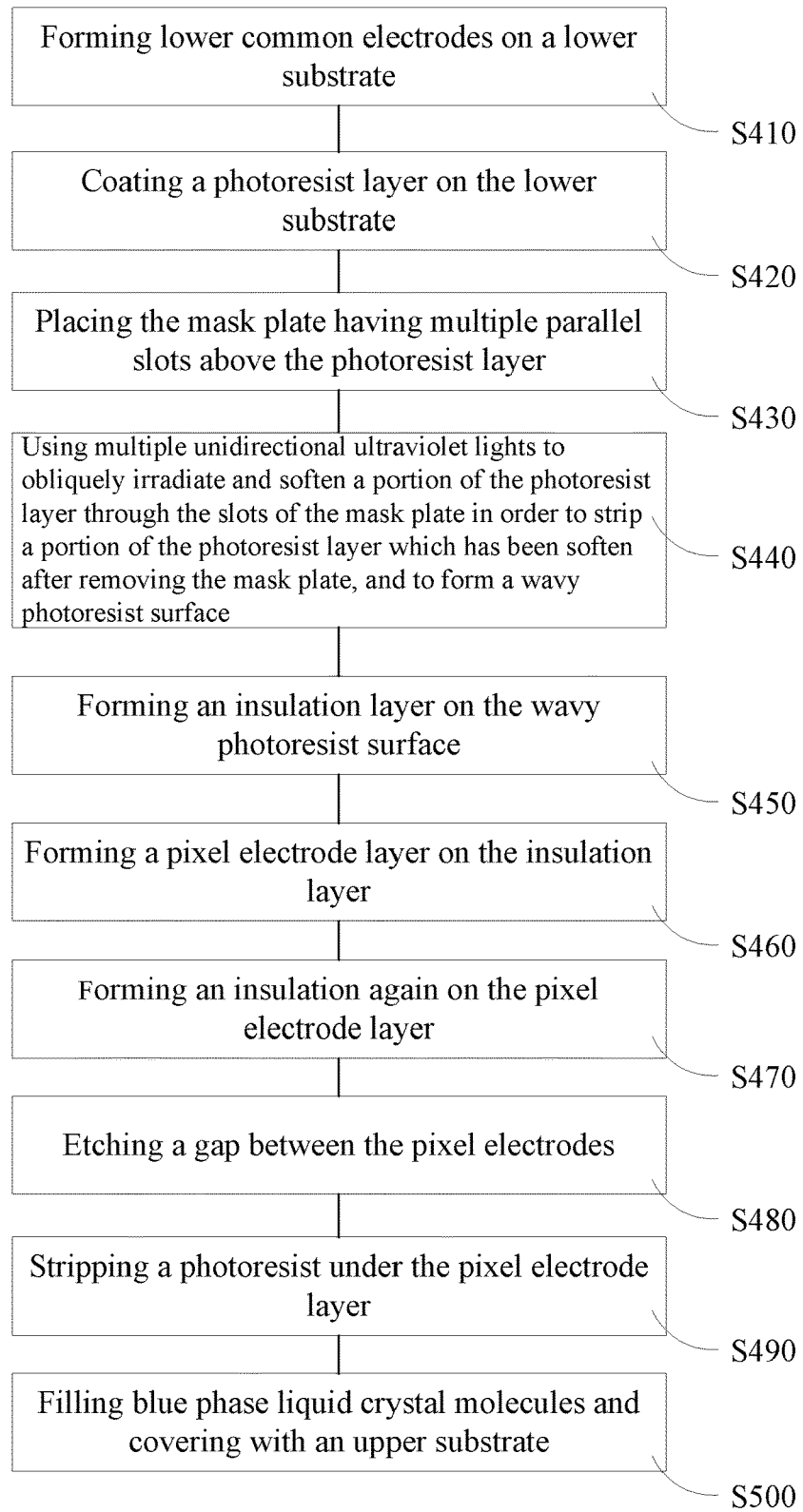
FIG. 4 is a flow chart of a method for manufacturing a blue phase liquid crystal display module according to an embodiment of the present invention.

The embodiment of the present invention also provides a method for manufacturing a blue phase liquid display module. With reference to FIG. 4, FIG. 4 is a flow chart of a method for manufacturing a blue phase liquid crystal display module according to an embodiment of the present invention. The method includes but not limited to following steps. It should be noted that the sawtooth-shaped structure of the pixel electrode in the present embodiment is not a limitation to the method for manufacturing a blue phase liquid display module. In another embodiment, the pixel electrode can be a wavy shape, a wedge shape, a trapezoidal shape or a circular shape.

Figure 5:
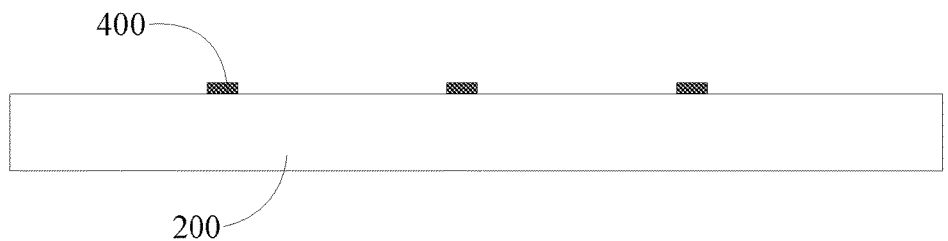
FIG. 5 is a schematic diagram of forming common electrodes in the method for manufacturing a blue phase liquid crystal display module in FIG. 4.

Step S410, forming lower common electrodes on a lower substrate. With reference to FIG. 5, FIG. 5 is a schematic diagram of forming common electrodes in the method for manufacturing a blue phase liquid crystal display module in FIG. 4. Wherein, the numeral 200 represents the lower substrate, and the numeral 400 represents the common electrodes.

Figure 6:
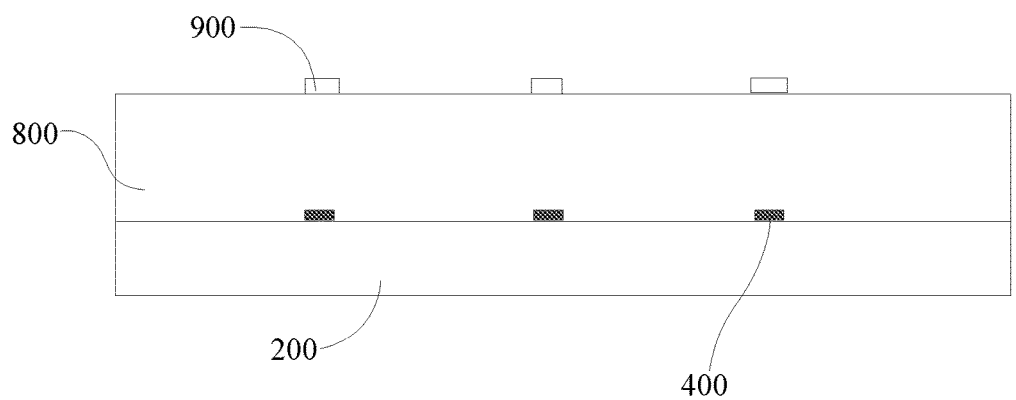
FIG. 6 is a schematic diagram of forming a photoresist layer in the method for manufacturing a blue phase liquid crystal display module in FIG. 4.

Step 420, coating a photoresist layer on the lower substrate. With reference to FIG. 6, FIG. 6 is a schematic diagram of forming a photoresist layer in the method for manufacturing a blue phase liquid crystal display module in FIG. 4. Wherein, the numeral 800 represents the photoresist layer, and the numeral 900 represents a mask plate.

Step S430, placing the mask plate having multiple parallel slots above the photoresist layer.

Step S440, using multiple unidirectional ultraviolet lights to obliquely irradiate and soften a portion of the photoresist layer through the slots of the mask plate in order to strip a portion of the photoresist layer which has been soften after removing the mask plate, and to form a wavy photoresist surface.

Figure 7:
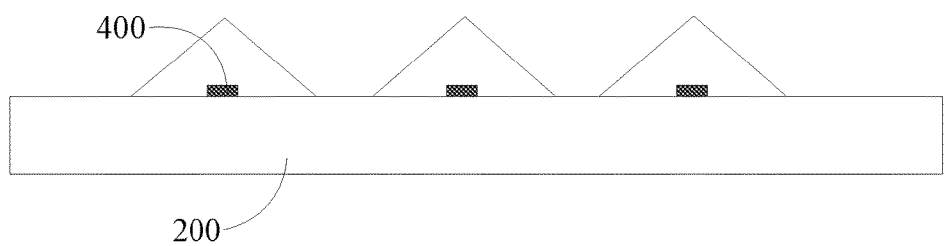
FIG. 7 is a schematic diagram of forming a photoresist layer having a wavy surface in the method for manufacturing a blue phase liquid crystal display module in FIG. 4.

With reference to FIG. 7, FIG. 7 is a schematic diagram of forming a photoresist layer having a wavy surface in the method for manufacturing a blue phase liquid crystal display module in FIG. 4. The unidirectional ultraviolet light can irradiate the photoresist layer through a rotated changing angle. Or, with an aid of the mask plate shown in FIG. 6, the unidirectional light can be fixed with a certain angle (in the present embodiment, above the wavy shape, an irradiation angle between the unidirectional ultraviolet light and a vertical direction ranges from −55 degrees to 55 degrees. Collocating with sizes of slots of the mask plate, a portion of the photoresist layer which has been irradiated is soften and stripped so as to form a photoresist surface (sawtooth shaped) as shown in FIG. 7. The method for stripping the soften photoresist is: forming a developing solution on the photoresist layer which has been irradiated by the ultraviolet light. Then, using deionized water to remove a photoresist dissolved in the developing solution. At the same time, a portion of the photoresist layer which is not soften at a bottom of the photoresist layer will be removed by the deionized water in order to form the wavy photoresist surface (sawtooth-shaped) as shown in FIG. 7.

Step S450, forming an insulation layer on the wavy photoresist surface.

Step S460, forming a pixel electro

Step S470, forming an insulation again on the pixel electrode layer.

Figure 8:
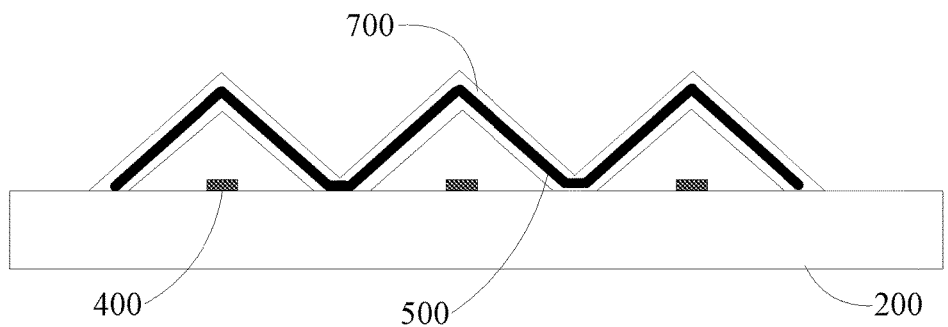
FIG. 8 is a schematic diagram of forming a sawtooth-shaped electrode layer and an insulation layer in the method for manufacturing a blue phase liquid crystal display module in FIG. 4.

With reference to FIG. 8, FIG. 8 is a schematic diagram of forming a sawtooth-shaped electrode layer and an insulation layer in the method for manufacturing a blue phase liquid crystal display module in FIG. 4. Wherein, the numeral 500 represents the pixel electrode layer and the numeral 700 represents the insulation layer. Wherein, each common electrode 400 (means lower common electrode here) is located right below a top portion of a sawtooth of the sawtooth-shaped photoresist (or, when the pixel electrode is wavy, located right below a top portion of a wave peak of the wavy photoresist).

Step S480, etching a gap between the pixel electrodes. The gap (space) is the D0 shown in FIG. 1.

Step 490, stripping a photoresist under the pixel electrode layer.

In the step S490, a method for stripping a photoresist under the pixel electrode layer is: first, utilizing an ultraviolet light to irradiate the pixel electrode such that a photoresist located at a lower surface of the pixel electrode is softened. Forming a developing solution on the photoresist located at the lower surface of the pixel electrode. Then, using deionized water to remove a photoresist dissolved in the developing solution. Wherein, the gap D0 is a channel that the developing solution and the deionized water enter the lower surface of the pixel electrode and flow out from the lower surface of the pixel electrode.

Step S500, filling blue phase liquid crystal molecules and covering with an upper substrate. Of course, in the step of covering with the upper substrate, the method further includes a step of manufacturing upper common electrodes on the upper substrate. Forming a blue phase liquid crystal display module shown in FIG. 2. Accordingly, the method for manufacturing the blue phase liquid crystal display module ends.

Comparing with the conventional art, in the method for manufacturing a blue phase liquid crystal module provided by the present invention, through manufacturing a hollow projected pixel electrode on a lower substrate of the blue phase liquid crystal module, utilizing oblique electric fields among the hollow projected pixel electrode, the upper substrate and the lower substrate to drive the blue phase liquid crystal molecules in order to decrease a driving voltage of the blue phase liquid crystal module. At the same time, a problem that cannot obtain a bright state of a liquid crystal display panel in a vertical electric field is avoided. In addition, through disposing a gap between the pixel electrodes, the blue phase liquid crystal molecules can reach an interior of the pixel electrode through a gap between the hollow projected pixel electrodes.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A method for manufacturing a blue phase liquid crystal display module, comprising steps of:
    forming multiple lower common electrodes on a lower substrate;
    coating a photoresist layer on the lower substrate;
    placing a mask plate having multiple parallel slots above the photoresist layer;
    using multiple unidirectional ultraviolet lights to obliquely irradiate and soften a portion of the photoresist layer through the slots of the mask plate to form a softened portion of the photoresist layer, and removing the softened portion of the photoresist after removing the mask plate so that a remaining portion of the photoresist forms a corrugated photoresist surface having alternating projections and depressions;
    forming a pixel electrode layer on the corrugated photoresist surface such that the pixel electrode layer has alternating projections and depressions and the remaining portion of the photoresist is located under the pixel electrode layer, wherein the pixel electrode layer has a lower surface facing the lower substrate and an opposite upper surface facing away from the lower substrate;
    etching the pixel electrode layer to form pixel electrodes that are spaced from each other by a gap;
    removing the remaining portion of the photoresist that is located under the pixel electrode layer such that a hollow concave-convex structure is formed between the lower surface of the pixel electrode layer and the lower substrate; and
    filling blue phase liquid crystal molecules and covering with an upper substrate such that the upper surface of the pixel electrode layer faces the upper substrate, wherein the upper substrate is provided with multiple upper common electrodes and wherein a first portion of the blue phase liquid crystal molecules fills in the hollow concave-convex structure and is filled between the lower surface of the pixel electrode layer and the multiple lower common electrodes and a second portion of the blue phase liquid crystal molecules is filled between the upper surface of the pixel electrode and the multiple upper common electrodes.

2. The method according to claim 1 further comprising, before the step of forming a pixel electrode layer on the corrugated photoresist surface, a step of forming an insulation layer on the corrugated photoresist surface.

3. The method according to claim 1 further comprising, after the step of forming a pixel electrode layer on the corrugated photoresist surface, a step of forming an insulation layer on the pixel electrode layer.

4. The method according to claim 1, wherein the corrugated photoresist layer comprises peaks and troughs alternating each other and each of the lower common electrodes is located exactly under one of the peaks.

5. The method according to claim 1, wherein the step of removing the remaining portion of the photoresist that is located under the pixel electrode layer comprises irradiating the pixel electrodes with ultraviolet light so as to soften the remaining portion of the photoresist that is located under the pixel electrode layer, applying a developing solution to the remaining portion of the photoresist in order to have the remaining portion of the photoresist dissolved in the developing solution, and applying deionized water to remove the developing solution and the photoresist dissolved in the developing solution.

6. The method according to claim 1, wherein the pixel electrodes are of a sawtooth-shape.

7. The method according to claim 6, wherein an included angle between a sawtooth edge of the pixel electrodes and one of the lower and upper substrates ranges from 25 degrees to 75 degrees.

\* \* \* \* \*